(12) United States Patent
Yamamoto et al.

(10) Patent No.: US 8,445,158 B2
(45) Date of Patent: May 21, 2013

(54) FUEL CELL SYSTEM AND OPERATION METHOD THEREOF

(75) Inventors: Masao Yamamoto, Osaka (JP); Masataka Ozeki, Osaka (JP)

(73) Assignee: Panasonic Corporation, Osaka (JP)

( * ) Notice: Subject to any disclaimer, the term of this patent is extended or adjusted under 35 U.S.C. 154(b) by 335 days.

(21) Appl. No.: 12/764,627

(22) Filed: Apr. 21, 2010

(65) Prior Publication Data

US 2010/0203412 A1 Aug. 12, 2010

Related U.S. Application Data

(63) Continuation of application No. 11/884,620, filed as application No. PCT/JP2006/302643 on Feb. 15, 2006, now abandoned.

(30) Foreign Application Priority Data

Feb. 18, 2005 (JP) .................................. 2005-043247

(51) Int. Cl.
*H01M 8/04* (2006.01)

(52) U.S. Cl.
USPC ................. 429/450; 429/26; 429/13; 429/22; 429/34

(58) Field of Classification Search ..................... 429/26, 429/13, 22
See application file for complete search history.

(56) References Cited

U.S. PATENT DOCUMENTS 7,052,790 B2 * 5/2006 Nakamura et al. ............ 429/410
2003/0129465 A1 * 7/2003 Nakamura et al. ............. 429/26

FOREIGN PATENT DOCUMENTS

| JP | 08-022833 | * | 1/1996 |
|---|---|---|---|
| JP | 8-22833 | | 1/1996 |
| JP | 9-63611 | | 3/1997 |
| JP | 9-306524 | | 11/1997 |
| JP | 2000-90948 | | 3/2000 |
| JP | 2000-208157 | | 7/2000 |
| JP | 2001-338668 | * | 12/2001 |
| JP | 2002-141095 | * | 5/2002 |
| JP | 2003-249252 | | 9/2003 |
| JP | 2004-179128 | | 6/2004 |
| JP | 2005-11619 | | 1/2005 |
| JP | 2005-339889 | | 12/2005 |

* cited by examiner

*Primary Examiner* — Melvin C Mayes
*Assistant Examiner* — Colette Nguyen
(74) *Attorney, Agent, or Firm* — McDermott Will & Emery LLP

(57) ABSTRACT

A fuel cell system (100) comprising: a fuel cell (1) configured to generate electric power using an oxidizing gas and a fuel gas; a recovered water tank (3) configured to store water recovered from an exhaust gas discharged from the fuel cell; a water storage tank (4) configured to store water used as cooling water for cooling the fuel cell; a water feed flow path (g) through which the water stored in the recovered water tank is supplied to the water storage tank; a pump (8) configured to force water to flow from the recovered water tank to the water storage tank within the water feed flow path; a water purifier (7) configured to purify the water forcibly flowed by said pump in the water feed flow path by means of a built-in TOC absorber (7a) before the water is supplied to the water storage tank; and a controller (101), wherein the controller controls the pump so as to operate in a stop period of the fuel cell system such that water moves in the water feed flow path.

8 Claims, 3 Drawing Sheets

FUEL CELL SYSTEM AND OPERATION METHOD THEREOF

This application is a Continuation of U.S. application Ser. No. 11/884,620, filed Aug. 17, 2007, now abandoned, which is a U.S. National Phase under 35 U.S.C. §371 of International Application No. PCT/JP2006/302643, filed Feb. 15, 2006, claiming priority of Japanese Application No. 2005-043247, filed Feb. 18, 2005, the entire contents of each of which are hereby incorporated by reference.

TECHNICAL FIELD

The present invention relates to fuel cell systems that are supplied with hydrogen and oxygen to generate electric power while the fuel cell being cooled by cooling water.

BACKGROUND ART

Fuel cell systems capable of high-efficiency, small-scaled power generation have been heretofore developed as distributed power generation equipment having high energy utilization efficiency. A primary reason for this is that a system for utilizing heat energy generated when the fuel cell systems generate electric power is easy to construct.

A fuel cell system has a fuel cell as the main body of its power generating section. The fuel cell is an electric cell that directly converts the chemical energy of a fuel (hydrogen) and an oxidant (oxygen) into electric energy through a specified electrochemical reaction. Therefore, in a fuel cell system, the fuel cell is supplied with hydrogen serving as a fuel and oxygen serving as an oxidant during power generation. In the fuel cell, the specified electrochemical reaction that utilizes the supplied hydrogen and oxygen proceeds so that the chemical energy of the hydrogen and oxygen is directly converted into electric energy by this specified electrochemical reaction, while heat and water are generated. Then, the electric energy generated through the specified electrochemical reaction in the fuel cell is supplied from the fuel cell system to the load. The heat, which is generated as the electrochemical reaction proceeds, is recovered by cooling water circulating within the fuel cell to keep the temperature of the fuel cell within a specified range. The heat, which has been recovered, is used in a heat exchanger etc. possessed by the fuel cell system to supply hot water etc. A typical fuel cell system has a hydrogen generator that generates a hydrogen-rich reformed gas. This reformed gas is fed to the fuel cell as a substantial fuel. A typical fuel cell system also has an air feeder by which air is supplied to the fuel cell as a substantial oxidant.

A fuel cell system has (i) a cooling water tank for storing cooling water used for cooling the fuel cell that generates heat during power generation, in order to keep the temperature of the fuel cell within a specified range; (ii) a pump for feeding the cooling water stored in the cooling water tank to a flow path within the fuel cell; (iii) a water purifier for purifying the cooling water fed by the pump before it is supplied to the flow path within the fuel cell; and (iv) a heat exchanger that is provided for the purpose of utilizing the heat of the cooling water for hot water supply etc., which cooling water has risen in temperature and has been discharged from the fuel cell. Herein, the water purifier includes an ion exchange resin (or ion-removal filter) in order to remove conductive ions such as metal ion that are likely to dissolve in the cooling water within the heat exchanger and the fuel cell. While the fuel cell system is in power generation operation, the ion exchange resin is supplied with the cooling water that has passed through the fuel cell, the heat exchanger and others. The conductive ions such as metal ion which have dissolved in the cooling water are removed by the ion exchange resin, and the cooling water from which the conductive ions have removed are supplied to the fuel cell, so that short circulation within the fuel cell caused by the conductive ions can be prevented.

However, there is a problem that most of the ion exchange resins that can be used for the water purifier are comparatively low in heat resistance. This problem is significant particularly where a minus ion exchange resin is used as the ion exchange resin. On the other hand, the temperature of the fuel cell rises to about 70° C. to 80° C. during power generation even when a proton-exchange membrane fuel cell is used as the fuel cell. Therefore, the temperature of the cooling water, which is circulated by the pump to cool the fuel cell, also rises to about 70° C. to 80° C., if the heat recovered by the cooling water in the heat exchanger etc. is not satisfactorily used. If the temperature of the cooling water supplied to the water purifier by the pump exceeds the allowable temperature limit of the ion exchange resin, the degradation of the ion exchange resin due to heat escalates, shortening the service life of the ion exchange resin.

As an attempt to solve the above problem, there has been proposed a fuel cell system capable of effectively removing the conductive ions dissolved in the cooling water without adversely affecting the service life of the ion exchange resin (e.g., Patent Document 1).

For effective removal of the conductive ions dissolved in the cooling water without adversely affecting the service life of the ion exchange resin, this proposed fuel cell system has, similarly to the conventional fuel cell system, (i) a cooling water tank for storing cooling water used for cooling the fuel cell; (ii) a water purifier for purifying the cooling water fed by the pump before it is supplied to the flow path within the fuel cell; and (iii) a heat exchanger that is provided for the purpose of utilizing the heat of the cooling water for hot water supply, which cooling water has been supplied by the pump and discharged from the fuel cell. The proposed fuel cell system further includes: (i) a condensed water tank for storing water discharged from the fuel cell during power generation; (ii) a second pump and water feed passage which are for supplying the water stored in the condensed water tank to the cooling water tank; (iii) a water purifier for purifying the water supplied from the second pump before it is supplied to the cooling water tank; and (iv) a water exhaust passage for discharging excessive cooling water in the cooling water tank to the condensed water tank.

In the proposed fuel cell system, when starting and/or terminating the power generating operation of the fuel cell system, the water stored in the condensed water tank is pumped up into the cooling water tank by activating the second pump after purified by the water purifier. Further, the second pump is activated during the power generating operation to thereby circulate water between the condensed water tank and the cooling water tank through the water feed passage, the water purifier and the water exhaust passage.

According to the proposed fuel cell system, even if the cooling water collected from the cooling water tank into the condensed water tank has a high temperature of 70° C. or more, the temperature of the water discharged from the fuel cell and collected into the condensed water tank is about 40° C. and therefore the temperature of the water supplied from the condensed water tank to the water purifier can be prevented from exceeding the allowable temperature limit of the ion exchange resin. With such an arrangement, the conductive ions dissolved in the cooling water can be removed without adversely affecting the service life of the ion exchange resin.

In addition, by circulating water between the condensed water tank and the cooling water tank through the water purifier, continuous water purification can be carried out so that the quality of the cooling water can be maintained during the power generating operation of the fuel cell system.

To sum up, the above proposal enables provision of a fuel cell system capable of removing the conductive ions dissolved in the cooling water without adversely affecting the service life of the ion exchange resin.

Patent Document 1: Japanese Kokai Patent Publication No. 2002-141095

DISCLOSURE OF THE INVENTION

The Problems that the Invention is to Solve

The above conventional system, however, has revealed the following problem. Since the power generating operation of the fuel cell system has an unbreakable relation with the purifying operation of the water purifier, the purifying operation of the water purifier stops when the power generating operation of the fuel cell system stops, so that bacteria (i.e., germs) propagate in the water during a stop period of the power generating operation of the fuel cell system. The problem of the propagation of bacteria is serious particularly when the water purifier has activated carbon in addition to the ion exchange resin because the activated carbon takes in and accumulates total organic carbon (hereinafter abbreviated as TOC) that is a nutrient for bacteria and therefore encourages their propagation. If the propagation of bacteria in the water is vigorous, the water flow paths are likely to be clogged and narrowed by the proliferous bacteria, which brings about damage to the water feeding function and water purifying function. Such damage is a cause of a failure in the normal power generating operation of the fuel cell system, for instance, when restarting the system.

The invention has been made in consideration of the above problems and a primary object of the invention is therefore to provide a fuel cell system capable of effectively inhibiting the propagation of bacteria in the water with a simple arrangement while the power generating operation of the fuel cell system is stopped, so that there is unlikely to occur damage to the water feeding function and the water purifying function.

Means for Solving the Problems

After keen investigation, the inventors have come to the conclusion that bacteria vigorously propagate in the water during a stop period of the power generating operation of the fuel cell system because part of the water contaminated with bacteria stays within the activated carbon of the water purifier that takes in and accumulates a large amount of TOC during water circulation. They also have found that the bacteria propagation in the water during a stop period of the power generating operation of the fuel cell system can be effectively restrained by removing them from the activated carbon of the water purifier which has taken in and accumulated a large amount of TOC by letting water flow into the activated carbon of the water purifier at a specified flow rate in a specified cycle during the stop period.

The problem presented by the conventional system can be overcome by a first fuel cell system according to the invention, the system comprising:

a fuel cell configured to generate electric power using an oxidizing gas and a fuel gas;

a recovered water tank configured to store water recovered from at least either of the oxidizing gas and fuel gas discharged from the fuel cell;

a purified water tank configured to store water used as a cooling water for cooling the fuel cell;

a water feed flow path through which the water stored in the recovered water tank is supplied to the purified water tank;

a pump configured to force water to flow from the recovered water tank to the purified water tank within the water feed flow path;

a water purifier configured to purify, in the water feed flow path, the water forced to flow by the pump, using a TOC absorber incorporated in the water purifier before the water is supplied to the purified water tank; and a controller, wherein the controller controls the pump so as to operate in a stop period of the fuel cell system such that water moves in the water feed flow path.

According to this arrangement, since the controller controls the pump so as to operate in the stop period of the fuel cell system such that water moves in the water feed flow path, the propagation of bacteria in the water can be restrained for a long period of time.

In this case, the controller may control the pump so as to periodically operate in the stop period to periodically move the water within the water feed flow path.

According to this arrangement, since the controller controls the pump so as to periodically operate in the stop period to periodically move the water within the water feed flow path, the propagation of bacteria in the water can be effectively restrained for a long period of time.

In this case, the controller may control the pump so as to periodically operate in the stop period in such a cycle that the propagation of bacteria can be restrained, thereby periodically moving the water within the water feed flow path.

According to this arrangement, since the controller controls the pump so as to periodically operate in the stop period in such a cycle that the propagation of bacteria can be restrained, thereby periodically moving the water within the water feed flow path, the propagation of bacteria in the water can be more effectively restrained for a long period of time.

In this case, the controller may control the pump so as to periodically operate in the stop period in a cycle of no less than 72 hours but no more than 168 hours, thereby periodically moving the water within the water feed flow path.

According to this arrangement, since the controller controls the pump so as to periodically operate in the stop period in a cycle of no less than 72 hours but no more than 168 hours, thereby periodically moving the water within the water feed flow path, the propagation of bacteria in the water can be practically restrained for a long period of time. In addition, whereas the propagation of bacteria in the water can be restrained, the load imposed on the ion exchanger of the water purifier can be minimized.

In this case, the fuel cell system may further comprise, as the purified water tank, a cooling water tank for storing the cooling water.

According to this arrangement, since the purified water tank is a cooling water tank for storing the cooling water, the degree of purification of the water within the cooling water tank can be maintained at a certain level.

In this case, the fuel cell system may further comprise a second water feed flow path through which the water stored in said cooling water tank is supplied to said recovered water tank, and the controller may control the pump so as to operate in the stop period of the fuel cell system to circulate water between the cooling water tank and the recovered water tank, passing through the water feed flow path and the second water feed flow path.

According to this arrangement, since the water in the cooling water tank is so circulated as to return to the cooling water tank after passing through the second water feed path, the recovered water tank and the water purifier in this order by way of the water feed flow path and the second water feed flow path, proper water circulation can be carried out.

There is provided a second fuel cell system according to the invention which is the same as the first fuel cell system of the invention except that a cooling water tank configured to store the cooling water is provided, in addition to the purified water tank, and the water stored in the purified water tank can be supplied to the cooling water tank.

According to this arrangement, the cooling water and the purified water are respectively independently stored so that proper water circulation can be carried out.

In this case, the fuel cell system may further comprise a second pump configured to supply the water stored in the purified water tank to the cooling water tank.

According to this arrangement, since the fuel cell system further comprises a second pump configured to supply the water stored in the purified water tank to the cooling water tank, the water in the purified water tank can be properly supplied to the cooling water tank according to need.

In this case, the fuel cell system may further comprise a second water feed flow path through which the water stored in the cooling water tank is supplied to the recovered water tank, and the controller may control the pump so as to operate in the stop period of the fuel cell system to circulate water between the purified water tank, the cooling water tank and the recovered water tank, passing through the water feed flow path and the second water feed flow path.

According to this arrangement, since the water stored in the purified water tank returns to the purified water tank after passing through the cooling water tank, the second water feed flow path, the recovered water tank and the water purifier in this order by way of the water feed flow path and the second water feed flow path, proper water circulation can be carried out.

In this case, the fuel cell system may further comprise a third water feed flow path through which the water stored in the purified water tank is supplied to the recovered water tank, and the controller may control the pump so as to operate in the stop period of the fuel cell system to circulate water between the purified water tank and the recovered water tank, passing through the water feed flow path and the third water feed flow path.

According to this arrangement, since the water in the purified water tank and the cooling water in the cooling water tank are separated so as not to be mixed with each other, the conductive ions such as metal ion contained in the cooling water can be prevented from being supplied to the water purifier.

In this case, the controller may control the pump so as to operate in the stop period of the fuel cell system such that where P1 represents the water feeding ability of the pump per unit time, T1 represents the operating time of the pump, and V1 represents the capacity of the TOC absorber, P1, T1 and V1 satisfy the following formula (1).

$$P1 \times T1 \geqq V1 \quad (1)$$

According to this arrangement, since P1, T1 and V1 satisfy the formula (1), the load imposed on the ion exchanger of the water purifier can be minimized.

In this case, the water purifier further has an ion exchanger.

According to this arrangement, since the water purifier further includes an ion exchanger, the water in the recovered water tank can be effectively purified.

Effect of the Invention

The fuel cell systems according to the embodiments of the invention are capable of effectively restraining the propagation of bacteria in the water by means of a simple arrangement while the power generating operation of the fuel cell system is stopped so that there is unlikely to occur damage to its water feeding function and water purifying function.

EXPLANATION OF REFERENCE NUMERALS

Figure 1:
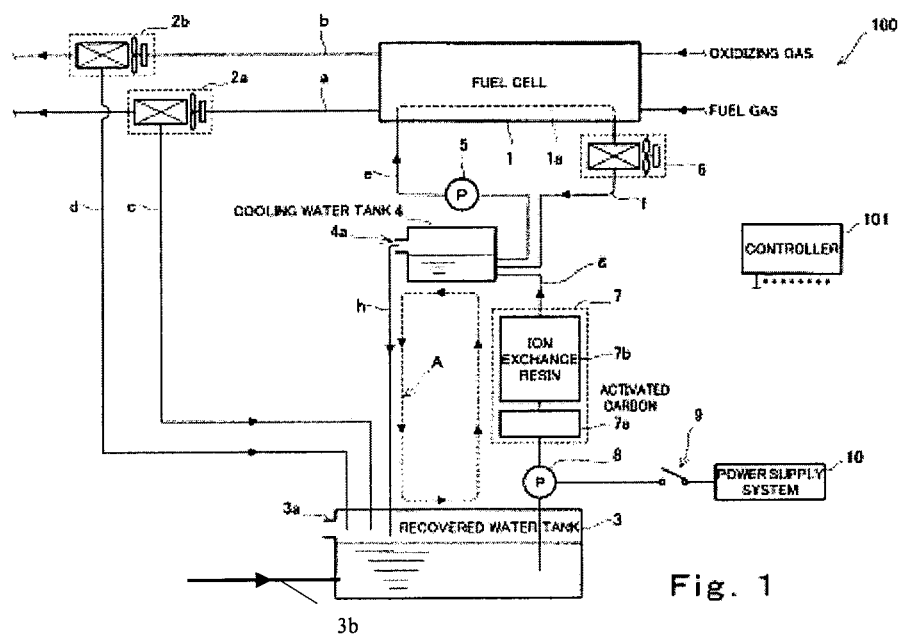
FIG. 1 is a block diagram schematically illustrating the structure of a fuel cell system according to a first embodiment of the invention.

1: fuel cell
1a: cooling water flow path
2a: fuel-side condenser
2b: oxidant-side condenser
3: recovered water tank
3a: recovered water drain outlet
4: cooling water tank
4a: cooling water drain outlet
5: cooling water circulation pump
6: heat exchanger
7: water purifier
7a: activated carbon
7b: ion exchange resin
8: recovered water feed pump
9: power source switch
10: power supply system
11: purified water tank
11a: purified water drain outlet
12: purified water feed pump
100, 200, 300: fuel cell system
101: controller
A: first circulation passage
B: second circulation passage
C: third circulation passage
a: fuel gas exhaust passage
b: oxidizing gas exhaust passage
c: fuel-side recovered water passage
d: oxidant-side recovered water passage
e: cooling water feed passage
f: cooling water exhaust passage
g: purified water exhaust passage
h: cooling water return passage
i: purified water exhaust passage
j: purified water feed passage
k: purified water return passage
l: purified water exhaust passage

BEST MODE FOR CARRYING OUT THE INVENTION

Figure 2:
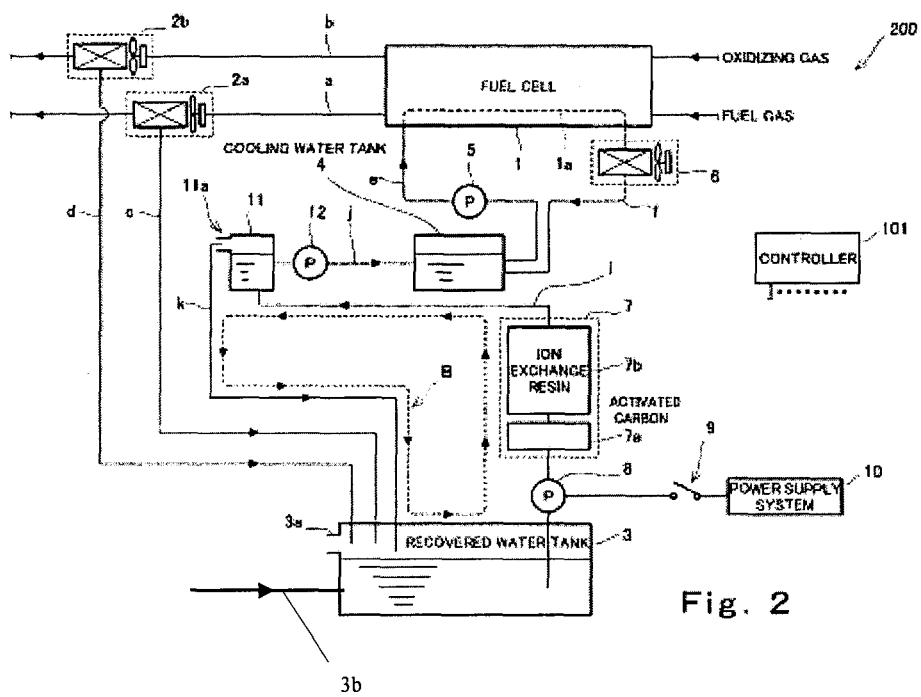
FIG. 2 is a block diagram schematically illustrating the structure of a fuel cell system according to a second embodiment of the invention.
Figure 3:
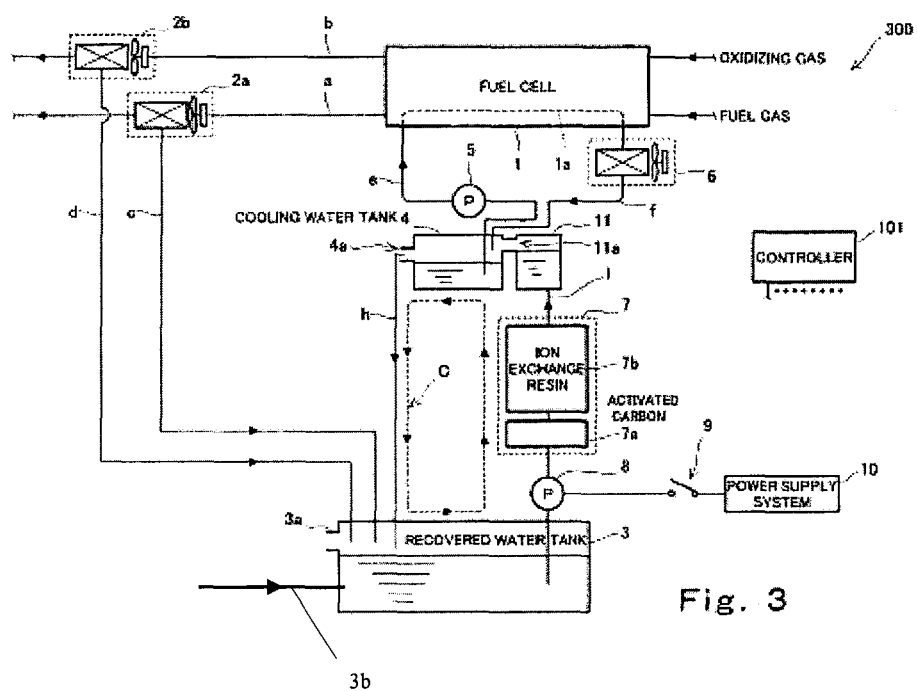
FIG. 3 is a block diagram schematically illustrating the structure of a fuel cell system according to a third embodiment of the invention.

Referring now to FIGS. 1 to 3, the best modes for carrying out the invention will be hereinafter described in detail.

First Embodiment

First of all, the structure of a fuel cell system according to a first embodiment of the invention will be explained in detail with reference to the drawings.

FIG. 1 is a block diagram schematically illustrating the structure of the fuel cell system according to the first embodiment of the invention. In FIG. 1, the solid lines connecting the elements that constitute the fuel cell system respectively designate a passage where water, a fuel gas, an oxidizing gas or the like flows. The arrows provided for the solid lines designate the flowing direction of the water, the fuel gas, the oxidizing gas or the like during normal operation. It should be noted that FIG. 1 shows only the elements indispensable for an explanation of the invention and other elements are omitted from the drawing.

As shown in FIG. 1, the fuel cell system 100 of the first embodiment has a fuel cell 1 as the main body of its power generating section. As the fuel cell 1, a proton-exchange membrane fuel cell is used in this embodiment. The fuel cell system 100 generates a specified amount of electric power to output, using a hydrogen-rich fuel gas (or reformed gas) and an oxidizing gas (which is usually air). The fuel gas is discharged from a hydrogen generator (not shown in FIG. 1) and supplied to the anode side (or fuel electrode side) of the fuel cell 1, whereas the oxidizing gas is supplied from an air feeder (not shown in FIG. 1) having a blower or the like to the cathode side (or air electrode side) of the fuel cell 1. More concretely, the fuel cell 1 directly converts chemical energy possessed by the hydrogen of the fuel gas and the oxygen of the oxidizing gas into electric energy, making use of a specified electrochemical reaction with a specified catalyst. By such energy conversion, the fuel cell 1 supplies electric energy (electric power) to the load that is connected to the fuel cell system 100. In the first embodiment, after used for the power generation within the fuel cell 1, the oxidizing gas supplied to the cathode side of the fuel cell 1 is treated by the moisture of the oxidizing gas such that it is brought into a desired humidified condition. If the humidity of the oxidizing gas is insufficient, part of the cooling water stored in a cooling water tank 4 (described later), for example, is evaporated within the fuel cell 1, thereby properly adjusting the humidity of the oxidizing gas. In addition, the fuel gas supplied to the anode side of the fuel cell 1 is adjusted and brought into the desired humidified condition in the hydrogen generator described earlier. During power generation, the fuel cell 1 generates heat. The heat generated by the fuel cell 1 is continuously recovered by the cooling water supplied to a cooling water flow path 1a formed in the fuel cell 1. It should be noted that a detailed description of the inner structure of the fuel cell 1 is skipped herein for the reason that the inner structure of the fuel cell 1 is the same as that of ordinary proton-exchange membrane fuel cells.

As shown in FIG. 1, the fuel cell system 100 has a fuel-side condenser 2a and an oxidant-side condenser 2b. The fuel-side condenser 2a and the oxidant-side condenser 2b include a water condensing mechanism using an air cooling fan. By means of the water condensing mechanisms, the fuel-side condenser 2a and the oxidant-side condenser 2b recover water that has been generated, through a specified electrochemical reaction in the fuel cell 1, from the redundant fuel gas (hereinafter referred to as "exhaust fuel gas") and redundant oxidizing gas (hereinafter referred to as "exhaust oxidizing gas") which redundant gases have not been used for the power generation and therefore discharged from the fuel cell 1. Herein, the exhaust fuel gas and exhaust oxidizing gas discharged from the fuel cell 1 are supplied to the fuel-side condenser 2a and the oxidant-side condenser 2b by way of an exhaust fuel gas passage a and an exhaust oxidizing gas passage b, respectively. In this embodiment, the exhaust fuel gas from which moisture has been removed by the fuel-side condenser 2a is supplied to the hydrogen generator described earlier. This exhaust fuel gas is supplied to a frame burner possessed by the hydrogen generator and then combusted in the frame burner to encourage the reforming reaction. The exhaust oxidizing gas from which moisture has been removed by the oxidant-side condenser 2b is discharged to the outside of the fuel cell system 100 in this embodiment. The water that has been recovered by the fuel-side condenser 2a and the oxidant-side condenser 2b is supplied to a recovered water tank 3 (described later) by way of a fuel-side recovered water passage c and an oxidant-side recovered water passage d. The structures of the fuel-side condenser 2a and the oxidant-side condenser 2b are the same as those of the condensers used for ordinary fuel cell systems and therefore a detailed description of their internal structures is skipped.

The fuel cell system 100 has a recovered water tank 3. The water recovered by the fuel-side condenser 2a and the oxidant-side condenser 2b is supplied to the recovered water tank 3 by way of a fuel-side recovered water passage c and an oxidant-side recovered water passage d. The recovered water tank 3 stores the water discharged from the fuel-side condenser 2a and the oxidant-side condenser 2b. The water stored in the recovered water tank 3 is properly supplied to the elements of the fuel cell system 100 that use water. Examples of the elements that use water include the hydrogen generator (not shown in FIG. 1) and a cooling water tank 4 described later. In this embodiment, a recovered water drain outlet 3a for discharging water is provided at a specified position in the side wall of the recovered water tank 3. Excessive water in the recovered water tank 3 overflows so that it is discharged to the outside of the fuel cell system 100 through the recovered water drain outlet 3a. The recovered water tank 3 communicates with the atmosphere through the overflow-type recovered water drain outlet 3a. Thereby, the amount of water stored in the recovered water tank 3 is properly controlled. Although not particularly shown in FIG. 1, a piping is connected to a specified position of the recovered water tank 3 through a shutoff valve or the like, which piping is connected to an infrastructure capable of supplying water such as a water line. Before starting up the fuel cell system 100, water is supplied from the water line to the recovered water tank 3 through the piping and the shutoff valve in order to store a necessary amount of water in the recovered water tank 3.

The fuel cell system 100 has the cooling water tank 4. This cooling water tank 4 stores cooling water used for cooling the fuel cell 1 that generates heat during the power generating operation. The cooling water stored in the cooling water tank 4 is forced out from the tank 4 by a cooling water circulation pump 5 such as a plunger pump to be supplied to the cooling water flow path 1a within the fuel cell 1 by way of a cooling water feed passage e. The cooling water, which has risen in temperature owing to the heat generation of the fuel cell 1 and has been discharged from the cooling water flow path 1a, is cooled through a heat exchange in the heat exchanger 6 and then returns to the cooling water tank 4 by way of a cooling water exhaust passage f. More specifically, the cooling water stored in the cooling water tank 4 is made to circulate between the cooling water tank 4 and the cooling water flow path 1a formed within the fuel cell 1, by the cooling water circulation pump 5 in order to cool the fuel cell 1 that generates heat during power generation. With the circulation of the cooling water by the cooling water circulation pump 5, the heat generated in the fuel cell 1 during power generation is continuously recovered so that the fuel cell 1 is cooled. In the cooling water tank 4 of this embodiment, a cooling water drain outlet 4a is provided at a specified position in the side wall of the tank 4, for discharging the cooling water. Connected to the cooling water drain outlet 4a is one end of a cooling water return passage h. The other end of the cooling water return passage h is located within the recovered water tank 3. Excessive cooling water in the cooling water tank 4 overflows through the cooling water drain outlet 4a to be discharged to the recovered water tank 3 through the cooling water return passage h. The cooling water tank 4 communicates with the atmosphere through the overflow-type cooling water return passage h, the recovered water tank 3, and the recovered water drain outlet 3a.

The fuel cell system 100 has the heat exchanger 6 described earlier. The heat exchanger 6 made a heat exchange between the cooling water that has risen in temperature and has been discharged from the cooling water flow path 1a of the fuel cell 1 and water supplied from the outside of the fuel cell system 100 for the purpose of supplying hot water. The heat exchanger 6 discharges the cooling water to the cooling water tank 4 through the cooling water exhaust passage f, which cooling water has been cooled through heat recovery. The cooling water, which has dropped in temperature and returned from the heat exchanger 6 to the cooling water tank 4, is again supplied from the cooling tank 4 to the cooling tank flow path 1a of the fuel cell 1 through the cooling water feed passage e by means of the cooling water circulation pump 5.

The fuel cell system 100 includes a water purifier 7 having a specified impurity removing member. The water purifier 7 purifies the water which is supplied from the recovered water tank 3 to the cooling water tank 4 through a purified water exhaust passage g by means of a recovered water feed pump 8 such as a plunger pump. Herein, the power source terminal of the recovered water feed pump 8 is connected to an output terminal of a power supply system 10 through a power source switch 9 capable of allowing and disallowing a supply of electric power, which power supply system 10 has an accumulator buttery or the like that can supply electric power irrespective of the operating condition of the fuel cell system 100. In addition, the water purifier 7 of this embodiment has, as the specified impurity removing member, an activated carbon 7a and an ion exchange resin 7b. The activated carbon 7a selectively removes TOC by absorption. TOC is a nutrient that encourages the propagation of bacteria entering the water from the atmosphere. The ion exchange resin 7b selectively removes conductive ions such as metal ion that have dissolved into the water within the fuel cell 1 and the heat exchanger 6. In the first embodiment, the capacity of the water purifier 7 is about 2 litters. It should be noted that the impurity removing member provided for the water purifier 7 is not necessarily limited to the activated carbon 7a and the ion exchange resin 7b but may be any other materials such as zeolite and ceramics provided that they are impurity removing members (i.e., ion exchangers or TOC absorbents) capable of removing impurities such as conductive ions, TOC, etc. from water.

The fuel cell system 100 further includes a controller 101. The controller 101 adequately controls the operations of the elements that constitute the fuel cell system 100. Although not particularly shown in FIG. 1, the controller 101 has a memory and a central processing unit (CPU) and others. The programs associated with the operations of the elements of the fuel cell system 100 are stored in the memory of the controller 101 beforehand. Based on the stored programs, the controller 101 properly controls the operation of the fuel cell system 100.

As shown in FIG. 1, in the fuel cell system 100 of the first embodiment, the recovered water tank 3, the water purifier 7, the purified water exhaust passage g, the cooling water tank 4 and the cooling water return passage h constitute a first circulation passage A for the water. In the first water circulation passage A, the recovered water feed pump 8 takes the water out from the recovered water tank 3 to supply to the water purifier 7. The water purified by the water purifier 7 is supplied to the cooling water tank 4 through the purified water exhaust passage g. Water excessively supplied to the cooling water tank 4 is discharged through the cooling water drain outlet 4a and then returns to the recovered water tank 3 by way of the cooling water return passage h. Thus, the fuel cell system 100 of the first embodiment is configured to enable circulation of the water of the recovered water tank 3 within the first water circulation passage A.

Although not particularly shown in FIG. 1, the fuel cell system 100 of the first embodiment has a material feeder, a hydrogen generator and an air feeder.

The material feeder supplies a material such as natural gas to the hydrogen feeder to generate hydrogen. In the first embodiment, the material feeder is constructed so as to supply natural gas serving as the material from a natural gas infrastructure. Although natural gas is used as the material for generating hydrogen in the first embodiment, the invention is not necessarily limited to this but any other materials may be used provided that they contain an organic compound composed of carbon and hydrogen such as hydrocarbon components (e.g., LPG); alcohols (e.g., methanol); and naphtha components. For instance, where LPG is used as the material, the material feeder is provided with an LPG tank.

The hydrogen generator is designed to mainly promote a reforming reaction between the material and vapor to generate a hydrogen-rich fuel gas, the material being natural gas supplied from the material feeder or other materials containing a carbon-hydrogen organic compound composed of carbon and hydrogen such as hydrocarbon components (e.g., LPG); alcohols (e.g., methanol); and naphtha components. This hydrogen generator has a reformer for inducing the reforming reaction; a carbon monoxide shift converter (hereinafter referred to as "shift converter") for reducing the amount of carbon monoxide contained in the reformed gas discharged from the reformer; and a carbon monoxide remover (hereinafter referred to as "purifier"). The reformer includes a reforming catalyst for promoting the reforming reaction; a flame burner for combusting a part of the material or the exhaust fuel gas returning from the part (i.e., the fuel cell 1) to which the fuel gas has been supplied, in order to supply heat required for letting the reforming reaction proceed properly; and a sirocco fan for supplying combustion air. The shift converter has a shifting catalyst for causing a reaction between the carbon monoxide contained in the fuel gas discharged from the reformer and vapor. The purifier has a CO removing catalyst for oxidation or methanation of carbon monoxide contained in the fuel gas discharged from the shift converter. The shift converter and purifier are respectively operated under temperature conditions suited for the respective chemical reactions occurring in them in order to effectively reduce the amount of carbon monoxide contained in the fuel gas.

The air feeder supplies air to the cathode side of the fuel cell 1 as the oxidizing gas by inhaling atmospheric air. This air feeder usually has a blower. As the blower, a blower fan such as a sirocco fan is suitably used.

Next, the basic power generating operation of the fuel cell system according to the first embodiment of the invention will be described in detail with reference to the drawings.

In this specification, the "operation period" of power generation of the fuel cell system defined herein consists of three operation periods, that is, the first operation period (start-up operation period) elapsing just after starting up the fuel cell system and before the fuel cell becomes capable of outputting the rated electric power; the second operation period (steady operation period) which elapses after completion of the first operation period and during which the fuel cell is able to output the rated electric power; and the third operation period (stop operation period) which elapses after completion of the second operation period and before the output of electric power from the fuel cell stops and during which post treatment etc. is performed. The period of time excluding the operation period of the fuel cell system is defined as the "stop period" of power generation of the fuel cell system. It should be noted that, in this stop period, electric power necessary for operating the controller of the fuel cell system is supplied to the controller from a commercial power source or the like. In addition, in the stop period, the elements that constitute the fuel cell system are in such a condition that they can be properly put in operation, controlled by the controller.

The fuel cell system 100 performs the following operation under the control of the controller 101.

When the fuel cell system 100 shown in FIG. 1 starts power generation, the hydrogen generator starts operation to generate the hydrogen-rich fuel gas necessary for the power generating operation of the fuel cell 1. More concretely, natural gas, which serves as the material used for generating hydrogen, is supplied from the material feeder to the reformer of the hydrogen generator. Further, the reformer of the hydrogen generator is supplied with water in order to generate vapor necessary for causing the reforming reaction. At that time, to cause the reforming reaction, the reforming catalyst provided in the reformer is heated by the heat generated by combusting the exhaust fuel gas etc. in the flame burner. For combustion of the exhaust fuel gas etc., air is supplied to the flame burner from the sirocco fan used for supplying combustion air. Thereby, the reformer of the hydrogen generator can generate the hydrogen-rich fuel gas through the vapor reforming reaction. Thereafter, the reformed gas, which has been generated by the reformer of the hydrogen generator, is supplied to the shift converter and the purifier. In the shift converter and the purifier, carbon monoxide contained in the fuel gas is effectively reduced and removed. The fuel gas of good quality, which has remained after reducing and removing carbon monoxide by the shift converter and the purifier, is then supplied to the anode side of the fuel cell 1.

When the hydrogen-rich fuel gas is supplied from the hydrogen generator to the anode side of the fuel cell 1, while the oxidizing gas being supplied to the cathode side of the fuel cell 1 from the air feeder, the fuel cell 1 starts power generation to output a specified amount of electric power, using the fuel gas and oxidizing gas fed to the anode and cathode side thereof. The exhaust fuel gas that has not been used for the power generation is discharged from the anode side of the fuel cell 1 and moisture-removed by the fuel-side condenser 2a, and then, returns to the hydrogen generator by way of the exhaust fuel gas passage a. Thereafter, the exhaust fuel gas is supplied to the flame burner of the hydrogen generator and combusted in the frame burner to cause the reforming reaction. After moisture is removed from the exhaust oxidizing gas discharged from the cathode side of the fuel cell 1 by the oxidant-side condenser 2b, the exhaust oxidizing gas is discharged to the outside of the fuel cell system 100 by way of the exhaust oxidizing gas passage b.

During the power generating operation, the fuel cell 1 generates heat through the electrochemical reaction for the power generation. The heat generated in the fuel cell 1 is continuously recovered by circulation of the cooling water possessed by the cooling water tank 4 and sent to the cooling water flow path 1a formed in the fuel cell 1 by way of the cooling water feed passage e and the cooling water exhaust passage f by means of the cooling water circulation pump 5. The heat recovered by the cooling water circulated by the cooling water circulation pump 5 is utilized, for instance, in the heat exchanger 6 for the purpose of supplying hot water. In the event that the amount of cooling water stored in the cooling water tank 4 becomes insufficient for some reason or that the quality of the cooling water stored in the cooling water tank 4 degrades, the cooling water tank 4 will be replenished with purified water according to need from the recovered water tank 3 through the water purifier 7 and the purified water exhaust passage g. The replenishment of water is carried out by the operation of the recovered water feed pump 8. Specifically, the recovered water feed pump 8 starts water replenishment operation when the power source switch 9 is turned ON to cause the power supply system 10 to supply electric driving power to the feed pump 8. If the amount of cooling water stored in the cooling water tank 4 becomes superfluous, excessive cooling water is discharged from the cooling tank 4 to the recovered water tank 3 by way of the cooling water drain outlet 4a and the cooling water return passage h. Thereby, the quality of the cooling water stored in the cooling water tank 4 can be maintained and the amount of cooling water is properly controlled.

During the power generating operation, the fuel cell 1 discharges the exhaust fuel gas and exhaust oxidizing gas which contain the water generated as the power generation proceeds. The exhaust fuel gas and exhaust oxidizing gas are supplied to the fuel-side condenser 2a and the oxidant-side condenser 2b through the exhaust fuel gas passage a and the exhaust oxidizing gas passage b. In the fuel-side condenser 2a and the oxidant-side condenser 2b, water is recovered from the exhaust fuel gas and exhaust oxidizing gas. The fuel-side condenser 2a and oxidant-side condenser 2b send the water recovered from the exhaust fuel gas and exhaust oxidizing gas to the recovered water tank 3 by way of the fuel-side recovered water passage c and oxidant-side recovered water passage d.

As described earlier, the water sent from the fuel-side condenser 2a and the oxidant-side condenser 2b to the recovered water tank 3 is supplied to the cooling water tank 4 according to need by the operation of the recovered water feed pump 8 during the power generating operation. At that time, the water stored in the recovered water tank 3 is purified by the water purifier 7 and then supplied to the cooling water tank 4. In the water purifier 7, TOC is selectively removed by the activated carbon 7a whereas conductive ions such as metal ion are selectively removed by the ion exchange resin 7b. Thereby, the water stored in the recovered water tank 3 is purified and the purified water is then supplied to the cooling water tank 4. In the fuel cell system 100 of the first embodiment, the water recovered from the exhaust fuel gas and exhaust oxidizing gas by the fuel-side condenser 2a and oxidant-side condenser 2b is stored in the recovered water tank 3, thereby continuously performing the power generating operation without replenishing the hydrogen generator and cooling water tank 4 with water that is usually supplied from the outside of the fuel cell system 100. If the amount of water stored in the recovered water tank 3 becomes insufficient for some reason, the recovered water tank 3 will be replenished with water from the water line 3b. On the other hand, if the amount of water stored in the recovered water tank 3 becomes superfluous, the excessive water will overflow and be discharged to the outside of the fuel cell system 100 through the recovered water drain outlet 3a of the recovered water tank 3. Thereby, the amount of water stored in the recovered water tank 3 is properly controlled.

Incidentally, in the fuel cell system 100, since the recovered water in the recovered water tank 3 and the cooling water in the cooling water tank 4 are exposable to the atmosphere as discussed earlier, the recovered water and the cooling water are likely to be contaminated with bacteria, TOC and the like. TOC, which has got mixed with the recovered water and the cooling water, is made to circulate between the recovered water tank 3 and the cooling water tank 4 through the water purifier 7 by the recovered water feed pump 8, so that it is selectively absorbed by the activated carbon 7a of the water purifier 7. In this case, the amount of TOC absorbed by the activated carbon 7a increases according to the time elapsed for the power generating operation of the fuel cell system 100. TOC is a nutrient for bacteria and the propagation of bacteria is encouraged as the amount of absorbed TOC increases. If a vast number of bacteria propagate within the recovered water and the cooling water, they impair the fluidity of the water so that there arises a high possibility that the flow paths for conveying the recovered water and the cooling water are blocked or narrowed.

In the fuel cell system 100, the power generating operation usually has an unbreakable relation with the purifying operation of the water purifier 7 (in this embodiment, the purifying operation is performed such that the recovered water is supplied from the recovered water tank 3 to the water purifier 7 to be purified by the water purifier 7 and this purified water is then supplied from the water purifier 7 to the cooling water tank 4). Therefore, while the power generating operation of the fuel cell system 100 is stopped, the supply of the recovered water from the recovered water tank 3 to the water purifier 7 stops. During the power generation stop period of the fuel cell system 100, water contaminated with bacteria stays within the activated carbon 7a of the water purifier that has absorbed a large amount of TOC and therefore become nutrient-dense, so that a large number of bacteria often propagate. In this case, a trouble such as a loss of supply pressure due to blockage and narrowing occurs in the purified water exhaust passage g and cooling water return passage h for conveying the recovered water and the cooling water. This sometimes causes damage to the water feeding function and water purifying function of the fuel cell system 100. The damage to the water feeding function and water purifying function could be a cause of a failure in the normal power generating operation of the fuel cell system 100 when starting up the system 100 again.

In the first embodiment, in order to provide a fuel cell system unsusceptible to damage to its water feeding function and water purifying function by effectively restraining the propagation of bacteria in the water during the power generating stop period with a simple arrangement, the power source switch 9 is turned ON in a specified cycle and period by the controller 101 during the stop period of the fuel cell system 100 so that electric power is supplied from the power supply system 10 to the recovered water feed pump 8. During the stop period of the fuel cell system 100, the recovered water feed pump 8 is operated with a specified feed rate in a specified cycle to let the cooling water in the cooling water tank 4 overflow through the cooling water drain outlet 4a, so that a specified amount of water is forcibly circulated in a specified cycle between the recovered water tank 3 and the cooling water tank 4 passing through the water purifier 7 as indicated by the first circulation passage A shown in FIG. 1.

In the first embodiment, the specified cycle for the water circulation is one week (168 hours) or less and more preferably no less than three days (72 hours) but no more than one week (168 hours). The reason for this is that if the water is not circulated one week or more in the first circulation passage A shown in FIG. 1, bacteria will propagate in the water of the fuel cell system 100 to such a degree that the bacteria blocks the water flowing in the purified water exhaust passage g, the cooling water return passage h and others. The reason why the specified water circulation period is set to three days or more is that since the load imposed on the ion exchange resin 7b of the water purifier 7 will increase if water is circulated in a cycle of three days or less, the degradation of the ion exchange resin 7b is prevented by reducing the load imposed thereon.

In the first embodiment, the specified water circulation amount is set to about 2.0 litters per circulating operation. Concretely, in the first embodiment, water is circulated at a rate of 50 cc per minute for 40 minutes in one circulating operation, taking account of the electric power consumption of the water circulation. In this case, the specified water circulation amount per circulating operation is more preferably set to about 2.4 litters. Concretely, it is more preferable to circulate the water at a rate of 60 cc per minute for 40 minutes in one circulating operation. The reason for this is that the capacity of the water purifier 7 of the fuel cell system 100 according to the first embodiment is about 2 litters and if the circulation amount is set to about 2.4 litters as noted above, the amount of water staying in the water purifier 7 does not exceed the capacity of the water purifier 7 so that the water can be replaced without fail.

In the first embodiment, the recovered water feed pump 8 is operated in a specified cycle and period during the stop period of the fuel cell system 100, thereby circulating a specified amount of water in a specified cycle between the recovered water tank 3 and the cooling water tank 4, so that the propagation of bacteria within the water can be restrained without wastefully consuming energy in the fuel cell system 100.

The effect of restraining bacteria in the fuel cell system 100 of the first embodiment is presumed and explained as follows.

During the power generating operation of the fuel cell system 100, TOC that has enter the water from the atmosphere is continuously absorbed by and accumulated in the activated carbon 7a that constitutes the water purifier 7. At that time, the amount of TOC absorbed by the activated carbon 7a presumably reaches to such a value that bacteria vigorously propagate within a relatively short time although it depends on the circumference of the installation site of the fuel cell system 100 and the absorbing ability of the activated carbon 7a relative to TOC.

Bacteria are generally classified into two types, i.e., aerobic bacteria and anaerobic bacteria. The aerobic bacteria need oxygen to propagate, whereas the anaerobic bacteria do not need oxygen to propagate. Since oxygen is not actively supplied to the circulating or dwelling water during the operation period and stop period in the fuel cell system 100, most of the bacteria propagating in the water stored in the recovered water tank 3 and in the activated carbon 7a etc. of the water purifier 7 are supposed to be anaerobic bacteria.

Incidentally, the growing speed of bacteria varies depending on the types of bacteria. For example, aerobic bacteria repeatedly fission once every 20 to 30 minutes, while consuming oxygen and TOC for propagation. On assumption that one aerobic bacterium repeatedly fissions once every 20 minutes and any of the aerobic bacteria born in the subsequent propagation does not die, the number of bacteria increases to about one billion after 12 hours. The growing speed of anaerobic bacteria differs from that of aerobic bacteria. Concretely, anaerobic bacteria repeatedly fission once every 4 hours even in a circumstance where TOC required for the propagation exists in a sufficient amount. On assumption that one anaerobic bacterium repeatedly fissions once every 4 hours and any of the anaerobic bacteria born in the subsequent propagation does not die, the number of bacteria born from one bacterium after 12 hours is about eight.

For restraining the vigorous propagation of bacteria within water in the fuel cell system 100, it is thought to be very effective to prevent water contaminated with bacteria from staying for a long time (e.g., one week or more in this embodiment) within the activated carbon 7a that includes a large amount of TOC.

In order to prevent a long stay of water contaminated with bacteria within the activated carbon 7a as just described above, the recovered water feed pump 8 is operated in a specified cycle and period during the stop period of the fuel cell system 100, thereby forcibly circulating a specified amount of water between the recovered water tank 3 and the cooling water tank 4 in a specified cycle. This enables it to eliminate the water contaminated with bacteria from the activated carbon 7a of the water purifier 7 in a specified cycle and prevent the stay of the water contaminated with bacteria. In consequence, the exuberant propagation of bacteria in the water of the fuel cell system 100 can be effectively restrained without wastefully consuming energy. Accordingly, the invention is successful in providing the highly-reliable fuel cell system 100 unsusceptible to damage to its water feed function and water purifying function. The stop period for the power generating operation of the fuel cell system 100 may be nighttime during which the load consumes much less electric power or the period of the user's long absence from home during which the load consumes little electric power. During nighttime and the user's long absence, the power generation of the fuel cell system 100 is stopped while electric power is supplied from the commercial power source to the load.

In the first embodiment, the propagation of bacteria in the water within the fuel cell system 100 is restrained not by use of a sterilizer such as an ultraviolet irradiator and a heating device but by simply circulating water with the existing recovered water feed pump 8 during the stop period of the fuel cell system 100. Therefore, there is no need to employ an additional element such as an ultraviolet irradiator and a heating device and the effective restraint of bacteria growth can be accomplished with a simple arrangement without wastefully consuming energy. In short, it becomes possible to provide the fuel cell system 100 that ensures economical efficiency and energy saving.

In the first embodiment, the water circulation cycle of the fuel cell system 100 is set to one week (168 hours) or less and more preferably set to no less than three days (72 hours) but no more than one week (168 hours). When operating the recovered water feed pump 8 to circulate water between the cooling water tank 4 and the recovered water tank 3, the water is cooled to a relatively low temperature by letting it stand for a long time so that water having high temperature is not supplied to the activated carbon 7a and ion exchange resin 7b of the water purifier 7 and, in consequence, the thermal degradation of the activated carbon 7a and the ion exchange resin 7b can be prevented. If water having a temperature of, for instance, 70° C. is supplied to the water purifier 7, the absorption property of the activated carbon 7a relative to organic components such as TOC decreases. In this case, the temperature of the water exceeds the allowable temperature limit of the ion exchange resin 7b and therefore heat denaturation occurs in the ion exchange resin 7b. In contrast with this, in the first embodiment, the water circulation is performed in a prolonged cycle as described earlier and therefore the temperature of the water stored in the recovered water tank 3 and the cooling water tank 4 drops without fail, so that the problems such as the degradation of the absorption property of the activated carbon 7a and the heat denaturation of the ion exchange resin 7b can be avoided. In short, it becomes possible to provide the fuel cell system 100 that assures the water purification ability of the water purifier 7 for a long period of time.

Although the cycle of the forcible water circulation between the recovered water tank 3 and the cooling water tank 4 is set to one week (168 hours) or less and more preferably set to no less than three days (72 hours) but no more than one week (168 hours) in the first embodiment, the cycle is not necessarily limited to this. In addition, although the amount of water forcibly circulated between the recovered water tank 3 and the cooling water tank 4 is set to about 2.0 litters in the first embodiment, the amount of water circulation is not necessarily limited to this. Specifically, the cycle and circulating amount of the forcible water circulation between the recovered water tank 3 and the cooling water tank 4 may be arbitrarily determined, provided that the propagation of bacteria can be restrained to such a degree that damage to the water feeding function and water purifying function of the fuel cell system 100 does not occur.

Since the growing speed of bacteria in water varies depending on the structure of the fuel cell system 100 and the types of bacteria, the cycle and amount of water circulation may be determined, for instance, according to the capacities and open areas of the recovered water tank 3, the cooling water tank 4, the water purifier 7 etc. as well as the types of bacteria etc. The growing speed of bacteria in water also varies depending on the temperature of water. For example, in winter time, water temperature drops so that the growing speed of bacteria in water is slow. On the other hand, in summer time, water temperature rises so that the growing speed of bacteria in water is fast. If the power generation of the fuel cell system 100 is performed for a relatively short time and then stopped, the degree of contamination of water with TOC and bacteria is relatively small and therefore the probability of subsequent bacteria propagation is small. Therefore, there is no need to fix the cycle and amount of water circulation to certain values, but may be arbitrarily determined taking account of the structure and operating condition of the fuel cell system 100 and the types of bacteria.

Although the controller 101 performs the control operation such that water is forcibly circulated between the recovered water tank 3 and the cooling water tank 4 in the first embodiment, the invention is not necessarily limited to this. For example, the invention is applicable to the case where, for preventing a long stay of water within the activated carbon 7a of the water purifier 7, the controller 101 controls the recovered water feed pump 8 so as to move water in the purified water exhaust passage g during the stop period of the fuel cell system 100 thereby discharging a sufficient amount of water from the activated carbon 7a of the water purifier 7. In short, any means may be employed as the means of preventing damage to the water feeding function and water purifying function of the fuel cell system 100 as far as they can prevent a long stay of water within the activated carbon 7a of the water purifier 7.

In the first embodiment, in order to replace the water staying within the water purifier 7 with the recovered water supplied from the recovered water tank 3 without fail, the amount of water circulated between the recovered water tank 3 and the cooling water tank 4 per circulating operation is more preferably set to about 2.4 litters, taking account of the fact that the capacity of the water purifier 7 is about 2 litters. Basically, the water circulation amount should be equal to the capacity of the water purifier 7 for reliable replacement of the water staying in the water purifier 7 and minimizing of the load imposed on the ion exchange resin 7b of the water purifier 7. The reason for this is that if the amount of water circulation largely exceeds the capacity of the water purifier 7, the load imposed on the ion exchange resin 7b will increase, adversely affecting the service life of the ion exchange resin 7b. While bearing in mind that the amount of water circulation between the recovered water tank 3 and the cooling water tank 4 should be basically equal to the capacity of the water purifier 7, the propagation of bacteria in water can be effectively restrained without impairing the water purifying function of the water purifier 7 by increasing, according to the situation, the water circulation amount slightly more than the capacity of the water purifier 7 to such a degree that the ion exchange resin 7b is not adversely affected.

As described earlier, it is important to prevent a stay of water within the activated carbon 7a of the water purifier 7 to prevent occurrence of damage to the water feeding function and water purifying function of the fuel cell system 100. From this viewpoint, it is essential to set the amount of water circulation (the amount of water movement) between the recovered water tank 3 and the cooling water tank 4 per one operation to a value equal to or higher than the volume of the activated carbon 7a.

As discussed earlier, in the first embodiment, the recovered water feed pump 8 is operated in a specified cycle and period during the stop period of the fuel cell system 100, whereby a specified amount of water is forcibly circulated between the recovered water tank 3 and the cooling water tank 4 in a specified cycle. At that time, the water levels of the recovered water tank 3 and the cooling water tank 4 fluctuate in the depth-wise directions of the tanks 3, 4 respectively owing to the forcible water circulation. Fluctuations in the water levels of the recovered water tank 3 and the cooling water tank 4 effectively restrain the progress of decomposition of the recovered water of the recovered water tank 3 and the cooling water of the cooling water tank 4 with time. The reason for this is that general water decomposition, which takes place in a so-called water storage tank under the condition in which the water level does not fluctuate, tends to progress particularly on the inner wall face of the water storage tank and the interface between the water and air. That is, in the first embodiment, since the recovered water feed pump 8 is operated to forcibly circulate water during the stop period of the fuel cell system 100, thereby forcibly causing fluctuations in the water levels of the recovered water and cooling water, the decomposition of the recovered water and cooling water can be effectively restrained even if bacteria enters the recovered water and cooling water through the recovered water drain outlet 3a of the recovered water tank 3 and the cooling water drain outlet 4a of the cooling water tank 4. This water decomposition restraining effect is derived from the water circulation and inherent to the fuel cell system. Thanks to the synergistic effect of the water decomposition restraining effects attributable to the water level fluctuations and attributable to the water circulation, the water decomposition can be more effectively restrained in the fuel cell system 100 than in the conventional system.

Although the fuel cell system 100 has a proton-exchange membrane fuel cell as the fuel cell 1 in the first embodiment, the invention is not necessarily limited to this. For instance, the fuel cell system 100 may use a phosphoric-acid fuel cell or an alkaline fuel cell as the fuel cell 1. In this case, the same effect as of the first embodiment can be attained.

Second Embodiment

FIG. 2 is a block diagram schematically illustrating the structure of a fuel cell system according to a second embodiment of the invention. In FIG. 2, the solid lines connecting the elements that constitute the fuel cell system respectively designate a passage where water, the fuel gas, the oxidizing gas or the like flows. The arrows provided for the solid lines designate the flowing direction of the water, the fuel gas, the oxidizing gas or the like during normal operation. It should be noted that FIG. 2 shows only the elements indispensable for an explanation of the invention and other elements are omitted from the drawing. In FIG. 2, those parts that correspond to the elements of the fuel cell system 100 of the first embodiment are identified by the same reference numerals.

As shown in FIG. 2, the fuel cell system 200 of the second embodiment has a structure substantially similar to that of the fuel cell system 100 of the first embodiment. However, the fuel cell system 200 of the second embodiment differs from the fuel cell system 100 of the first embodiment in that the system 200 further includes a purified water tank 11 for storing water purified by the water purifier 7 and a purified water feed pump 12 for feeding water from the purified water tank 11 to the cooling water tank 4. Except the above points, the fuel cell system 200 of the second embodiment is the same as the fuel cell system 100 of the first embodiment.

As just mentioned above, the fuel cell system 200 of the second embodiment has the purified water tank 11. The purified water tank 11 stores the water discharged from the water purifier 7 before it is supplied to the cooling water tank 4. The water purified by the water purifier 7 is supplied to the purified water tank 11 through a purified water exhaust passage i. The superfluous water of the purified water tank 11 returns to the recovered water tank 3 by way of a purified water return passage k after discharged from a purified water drain outlet 11a formed at a specified position in the purified water tank 11. Specifically, in the second embodiment, the first circulation passage A for water of the first embodiment is replaced with a second circulation passage B for water circulation shown in FIG. 2. Thus, the feature of the fuel cell system 200 of the second embodiment resides in that the purified water tank 11 is provided so as to constitute the second circulation passage B, thereby making the cooling water tank 4 independent from the first circulation passage A for water shown in FIG. 1.

As shown in FIG. 2, the fuel cell system 200 has the purified water feed pump 12. The purified water feed pump 12 supplies the water stored in the purified water tank 11 to the cooling water tank 4 through a purified water feed passage j. In the event that the amount of cooling water stored in the cooling water tank 4 runs short, the cooling water tank 4 will be replenished with water from the purified water tank 11 by the operation of the purified water feed pump 12.

In the second embodiment, in order to prevent a long stay of water contaminated with bacteria within the activated carbon 7a, the recovered water feed pump 8 is supplied with electric power from the power supply system 10, by turning the power source switch ON in a specified cycle and period by the controller 101 during the stop period of the fuel cell system 200. Then, the recovered water feed pump 8 is operated in a specified cycle and period, thereby supplying a specified amount of water from the recovered water tank 3 to the water purifier 7 in a specified cycle. The water, which has been purified by the water purifier 7, is pushed out by the water supplied to the water purifier 7 by the recovered water feed pump 8 and supplied to the purified water tank 11 by way of the purified water exhaust passage i. The water, which has become superfluous in the purified water tank 11, is discharged through the purified water drain outlet 11a and then returns to the recovered water tank 3 by way of a purified water return passage k. The second embodiment is thus characterized in that water is forced to circulate between the recovered water tank 3 and the purified water tank 11 passing through the water purifier 7 (as indicated by the second circulation passage B) during the stop period of the fuel cell system 200. The water contaminated with bacteria is discharged from the activated carbon 7a of the water purifier 7 in a specified cycle to inhibit a stay of the water contaminated with bacteria so that bacteria propagation in the water of the fuel cell system 200 can be effectively reliably restrained without wastefully consuming energy. Accordingly, the second embodiment is successful in providing the highly-reliable fuel cell system 200 unsusceptible to damage to its water feeding function and water purifying function.

According to the second embodiment, since the cooling water tank 4 is independent from the second circulation passage B shown in FIG. 2, the cooling water stored in the cooling water tank 4 does not return to the recovered water tank 3. Thereby, the conductive ions such as metal ion which have been dissolved into the cooling water in the cooling water flow path 1a of the fuel cell 1 can be prevented from being supplied to the water purifier 7, so that the load imposed on the ion exchange resin 7b by the conductive ions can be reduced or eliminated. In short, the deterioration of the ion exchange resin 7b can be restrained. Further, since the load imposed on the ion exchange resin 7b by the conductive ions can be reduced, the ion exchanging/removing ability of the ion exchange resin 7b can be effectively utilized for more reliably performing the purification of the recovered water. As a result, the degree of purification of the water used in the fuel cell system 200 of the second embodiment can further increased.

In the second embodiment, the cycle of water circulation between the recovered water tank 3 and the purified water tank 11 and the water circulation amount may be properly determined in consideration of the structure of the fuel cell system 200 etc. based on, for instance, the evaluation result of sampling of the propagation degree of bacteria in the water. In addition, the size (maximum water storage capacity) of the purified water tank 11 may be determined taking account of the quantity of cooling water replenished to the cooling water tank 4 in the event of shortage during power generation. Except these points, the second embodiment does not differ from the first embodiment.

Third Embodiment

FIG. 3 is a block diagram schematically illustrating the structure of a fuel cell system according to a third embodiment of the invention. In FIG. 3, the solid lines connecting the elements that constitute the fuel cell system respectively designate a passage where water, a fuel gas, an oxidizing gas or the like flows. The arrows provided for the solid lines designate the flowing direction of the water, the fuel gas, the oxidizing gas or the like during normal operation. It should be noted that FIG. 3 shows only the elements indispensable for an explanation of the invention and other elements are omitted from the drawing. In FIG. 3, those parts that correspond to the elements of the fuel cell systems 100, 200 of the first and second embodiments are identified by the same reference numerals.

As shown in FIG. 3, the fuel cell system 300 of the third embodiment has a structure substantially similar to that of the fuel cell system 200 of the second embodiment, including the purified water tank 11. The purified water tank 11 stores the purified water discharged from the water purifier 7 in the similar way to the second embodiment. The water purified in the water purifier 7 is supplied to the purified water tank 11 through a purified water exhaust passage l instead of the purified water exhaust passage i in the similar way to the second embodiment. In the third embodiment, the water, which has become superfluous in the purified water tank 11, overflows through the purified water drain outlet 11a so as to be supplied to the cooling water tank 4. When comparing the water level of the purified water tank 11 with the water level of the cooling water tank 4 at the time of overflowing in the fuel cell system 300, the latter is lower than the former as seen from FIG. 3. Therefore, the purified water can be moved from the purified water tank 11 to the cooling water tank 4 but the cooling water cannot be reversely moved from the cooling water tank 4 to the purified water tank 11. That is, the fuel cell system 300 of the third embodiment is designed to allow a unidirectional water flow from the purified water tank 11 to the cooling water tank 4. The cooling water, which has become superfluous in the cooling water tank 4, is discharged, overflowing through the cooling water drain outlet 4a of the cooling water tank 4 and then returns to the recovered water tank 3 by way of the cooling water return passage h. Namely, in the third embodiment, a third circulation passage C for water is formed in place of the first circulation passage A of the first embodiment and the second circulation passage B of the second embodiment, as shown in FIG. 3. In the fuel cell system 300 of the third embodiment, one end of the purified water drain outlet 11a of the purified water tank 11 is connected to a specified position of the cooling water tank 4 in order to supply water from the purified water tank 11 to the cooling water tank 4 without use of a water delivery means such as a pump. Thereby, water can be supplied from the purified water tank 11 to the cooling water tank 4. The fuel cell system 300 is characterized by the use of the third circulation passage C for water in place of the first and second circulation passages A, B.

In the third embodiment, in order to prevent a long stay of water contaminated with bacteria within the activated carbon 7a, the power source switch 9 is turned ON in a specified cycle and period by the controller 101 during the stop period of the fuel cell system 300 so that electric power is supplied from the power supply system 10 to the recovered water feed pump 8. Thus, the recovered water feed pump 8 is operated in a specified cycle and period, thereby circulating a specified amount of water in a specified cycle so as to be supplied from the recovered water tank 3 to the water purifier 7. The water purified by the water purifier 7 is forced out by the water supplied to the water purifier 7 by the recovered water feed pump 8 and subsequently supplied to the purified water tank 11 by way of the purified water exhaust passage l. Then, the water, which has become superfluous in the purified water tank 11, overflows and is supplied to the cooling water tank 4 through the purified water drain outlet 11a. The water, which has become superfluous in the cooling water tank 4, overflows and is supplied to the recovered water tank 3 again through the cooling water drain outlet 4a and the cooling water return passage h. Similarly to the first and second embodiments, the third embodiment is designed such that, in order to more reliably replace the water staying within the water purifier 7 with water supplied from the recovered water tank 3, the amount of water circulated between the purified water tank 11, the cooling water tank 4 and the recovered water tank 3 per circulating operation is set to about 2.4 litters, taking account of the fact that the capacity of the water purifier 7 is about 2 litters.

In the third embodiment, during the stop period of the fuel cell system 300, water is forcibly circulated between the purified water tank 11, the cooling water tank 4 and the recovered water tank 3 as indicated by the third circulation passage C shown in FIG. 3. Like the first and second embodiments, the water contaminated with bacteria is eliminated from the activated carbon 7a of the water purifier 7 in a specified cycle thereby preventing a stay of the water contaminated with bacteria, so that the vigorous propagation of bacteria in the water of the fuel cell system 300 can be effectively reliably restrained without causing wasteful energy consumption. Thus, the third embodiment is successful in providing the highly-reliable fuel cell system 300 unsusceptible to damage to its water feeding function and water purifying function.

According to the third embodiment, since water can be supplied from the purified water tank 11 to the cooling water tank 4 without use of a water delivery means such as a pump, the structure of the fuel cell system 300 can be more simplified, compared to the structure of the fuel cell system 200 of the second embodiment. In addition, since there is no need to use a water delivery means such as a pump, the power consumption of the fuel cell system 300 can be reduced and the fuel cell system 300 is more economically provided.

Although the cooling water tank 4 is connected to the purified water tank 11 through the purified water drain outlet 11a in the third embodiment, the invention is not necessarily limited to this. For example, the invention is also applicable to cases where the cooling water tank 4 and the purified water tank 11 are integrally formed and the cooling water of the cooling water tank 4 and the purified water of the purified water tank 11 are separated from each other by a partition wall so as to allow an overflow of water from the purified water tank 11 into the cooling water tank 4. This arrangement is able to attain the same function and effects as of the third embodiment.

In the third embodiment, the cycle and amount of water circulation between the purified water tank 11, the cooling water tank 4 and the recovered water tank 3 may be properly determined like the first and second embodiments. Similarly to the second embodiment, the size (maximum water storage capacity) of the purified water tank 11 may be determined taking account of replenishment quantity in the event of shortage of the cooling water stored in the cooling water tank 4 during the power generating operation. The third embodiment does not differ from the first and second embodiments except the above points.

INDUSTRIAL APPLICABILITY

The fuel cell systems constructed according the embodiments of the invention are industrially applicable as a fuel cell system capable of effectively restraining propagation of bacteria in the water during the power generation stop period of the fuel cell system with a simple arrangement so that the fuel cell system is unsusceptible to damage to its water feed function and water purifying function.

The invention claimed is:

1. A method for operating a fuel cell system, comprising the steps of:
   during an electric power generating operation of a fuel cell, recovering water to a recovered water tank from at least one of an oxidizing gas and fuel gas discharged from said fuel cell; and
   in a stop period of said fuel cell system, that is, in a period from when a stop operation period of said fuel cell terminates until when a start-up operation period of said fuel cell starts, causing a pump, disposed on a water feed flow path through which the water is supplied from said recovered water tank to a purified water tank, to periodically operate in such a cycle that propagation of bacteria in a total organic carbon (TOC) absorber incorporated in a water purifier disposed on said water feed flow path is able to be restrained, wherein:
   said fuel cell system includes, as said purified water tank, a cooling water tank for storing cooling water; and
   said fuel cell system includes a second water feed flow path through which the water in said cooling water tank is supplied to said recovered water tank; and in the stop period of said fuel cell system, said pump operates to circulate the water between said cooling water tank and said recovered water tank through said water feed flow path and said second water feed flow path.

2. The method according to claim 1, wherein in the stop period of said fuel cell system, said pump periodically operate in a cycle of no less than 72 hours but no more than 168 hours.

3. The method according to claim 1, wherein:
   the water in said purified water tank is able to be supplied to said cooling water tank.

4. The method according to claim 3, wherein said fuel cell system further includes a second pump configured to supply the water in said purified water tank to said cooling water tank.

5. The method according to claim 3, wherein:
   said fuel cell system includes a second water feed flow path through which the water in said cooling water tank is supplied to said recovered water tank; and
   in the stop period of said fuel cell system, said pump operates to circulate the water among said purified water tank, said cooling water tank, and said recovered water tank through said water feed flow path and said second water feed flow path.

6. The method according to claim 3, wherein:
   said fuel cell system includes a third water feed flow path through which the water in said purified water tank is supplied to said recovered water tank; and
   in the stop period of said fuel cell system, said pump operates to circulate the water between said purified water tank and said recovered water tank through said water feed flow path and said third water feed flow path.

7. The method according to claim 3, wherein in the stop period of said fuel cell system, said pump operates to deliver water, the amount of which is equal to or larger than a volume of said TOC absorber.

8. The method according to claim 3, wherein said water purifier further has an ion exchanger.

* * * * *